Feb. 23, 1932.  R. W. KALTENBACH  1,846,970
CAR DUMPER
Filed Aug. 14, 1929   8 Sheets-Sheet 1

FIG.-1

Inventor
Robert W. Kaltenbach
By Bates, Gohrick & Teare
Attorney

Fig. -2

Feb. 23, 1932.  R. W. KALTENBACH  1,846,970
CAR DUMPER
Filed Aug. 14, 1929   8 Sheets-Sheet 3

Inventor
Robert W. Kaltenbach
By Bates, Goldrick & Teare
Attorney

Feb. 23, 1932.   R. W. KALTENBACH   1,846,970
CAR DUMPER
Filed Aug. 14, 1929   8 Sheets-Sheet 5

Inventor
Robert W. Kaltenbach
By Bates, Goldrick & Teare
Attorney

Feb. 23, 1932.  R. W. KALTENBACH  1,846,970
CAR DUMPER
Filed Aug. 14, 1929  8 Sheets-Sheet 7

Inventor
Robert W. Kaltenbach
By Bates, Golrick & Teare
Attorney

Feb. 23, 1932.    R. W. KALTENBACH    1,846,970
CAR DUMPER
Filed Aug. 14, 1929    8 Sheets-Sheet 8

F/G. 17

F/G.-18

F/G.-19

Inventor
Robert W. Kaltenbach
By Bates, Golrick & Teare
Attorney

Patented Feb. 23, 1932

1,846,970

UNITED STATES PATENT OFFICE

ROBERT W. KALTENBACH, OF CLEVELAND HEIGHTS, OHIO

CAR DUMPER

Application filed August 14, 1929. Serial No. 385,736.

This invention relates to car dumpers and particularly to those which have a cradle into which the car is shunted and which is provided with suitable mechanism for clamping the car onto the tracks during the dumping operation. With apparatus which has been used heretofore, a car enters the cradle, and is moved laterally during the initial movement of the cradle. The lateral movement is continued until the car strikes wooden buffer blocks which heretofore have been bolted or otherwise affixed to the side of the cradle, and which function to absorb most of the weight of the car when the car has been turned on its side during the emptying operation. After the dumping operation is completed, the final motion of the cradle is accompanied by a lateral movement of the car out of contact with the buffer blocks until the tracks on which the car is mounted are in alignment with the approach and run-off tracks respectively.

To effect such lateral movement of the car in the cradle, the practice has been to utilize a platen on which the car is placed and to mount the platen rollers which are arranged to move in trackways extending transversely of the cradle. On large installations, the weight of the platen is about 26,000 pounds, which is usually counterweighted by a like amount. Thus, it is apparent that considerable power must be expended to move the platen and the car. Apart from this consideration, attention must be given at frequent intervals to the condition of the platen, as wear of the operating parts causes mis-alignment of the tracks. Furthermore, engagement of the car with the buffer blocks, produces an impact of considerable force that wears the blocks quickly and tends to damage the car. In addition, it produces tremendous working stresses, which necessitate the use of heavy structural members to withstand the severe impact stresses.

The principal object of the present invention is to provide means for enabling a car to move freely into a cradle, and then to cause lateral engagement between the side of the cradle and car without necessitating the use of a platen. Thus, I eliminate the weight of the platen, and the platen counterweight, as well as the mechanism for moving the platen and the car toward the side of the cradle during the dumping operation, and for returning it after such operation is completed. Furthermore, by eliminating the necessity for moving this exorbitant weight of material, I can complete the dumping operation in a shorter period of time and at a material reduction in power consumption. Thus, other conditions being equal, I can increase the capacity of a given dumper for a definite unit of time, and shorten the period of time during which a barge or boat must remain idle during the loading operation.

I carry out the above objects by maintaining the car supporting tracks in stationary position upon the cradle, and by moving the buffer blocks toward the car during the initial movement of the cradle until they engage the car. Thereafter, in one form of my invention I use the force exerted by the counterweights to maintain the blocks in engagement with the side of the car. Several different forms of mechanism may be utilized for causing such lateral movement of the buffers, as I have illustrated in the drawings, and have pointed out in the following description.

Figure 1:
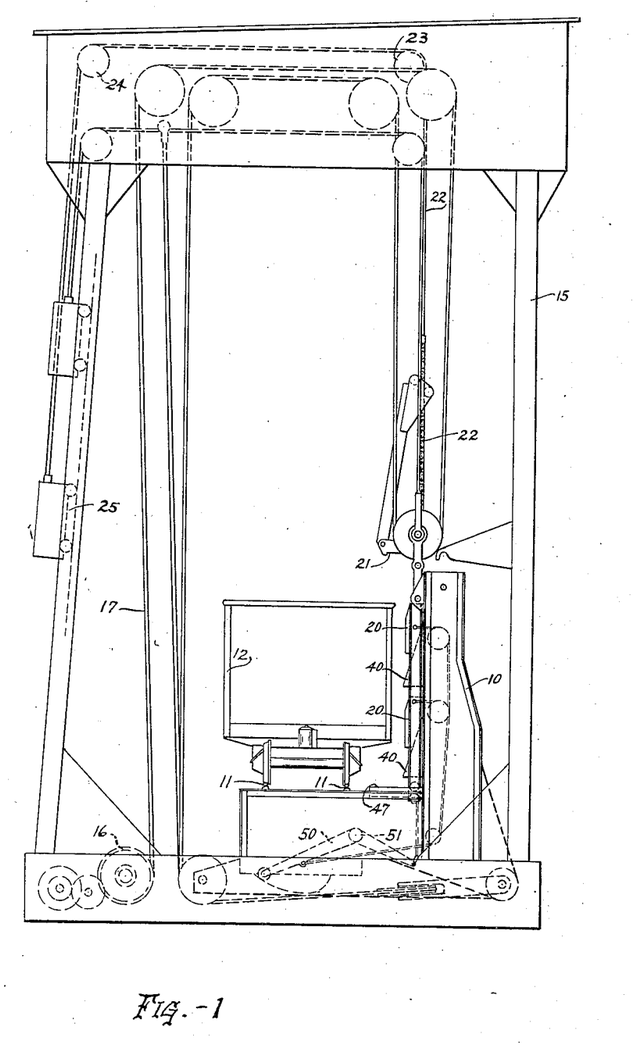
Fig. 1 is an end elevation of a car dumping apparatus embodying one form of my invention.

Referring now to the form of apparatus illustrated in Fig. 1, 10 indicates a cradle, 11 tracks carried thereby, and 12 a car which is supported upon the tracks. A frame for supporting the counterweights and providing a guideway for the cradle is illustrated in general at 15, while a hoisting drum is shown in general at 16 adjacent the base of the frame. Hoisting cables 17 lead from the drum over suitable sheaves on the frame and cradle to effect a raising and lowering of the cradle in the usual way.

The present invention is concerned with the provision of means for engaging the side of the car and for supporting it as the car is turned. The apparatus illustrated in Fig. 1 comprises means for moving buffer blocks 20 from the full line position indicated in Fig. 1 to the broken line position 20a in Fig. 2. In the full line position, the buffers are out of contact with the car to a sufficient extent to permit the car to be moved onto and away from the cradle. This position represents the normal or "rest" position of the cradle. The apparatus for moving the buffers into contact with the car is arranged to function during the initial movement of the dumping operation, and preferably to effect contact before the clamps 21 engage the top of the car.

Figure 4:
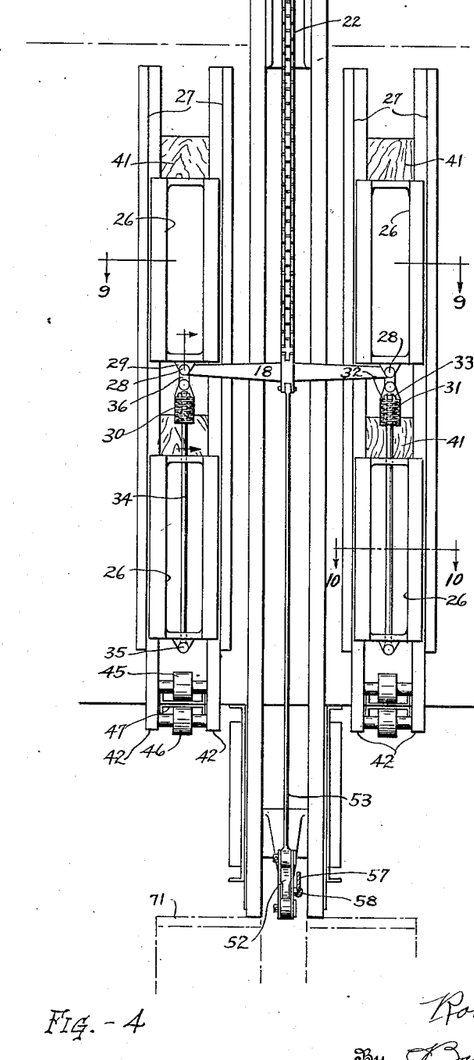
Fig. 4 is a view of the buffer block operating mechanism.

To insure engagement of the buffers uniformly with the car, I prefer to provide a pair of buffers to each clamp and to space the buffers at equal distances from the center line of the clamp. This is shown particularly in Fig. 4, where the clamp chain is indicated at 22 as passing downwardly in the usual manner along the rear central part of the clamp. The upper end of the chain is attached to a cable 22, which leads over the sheaves 23 and 24 at the upper part of the frame and is attached to a counterweight 25. The clamp end of the chain is shown as being attached to a cross bar 18 which extends horizontally in back of the clamp. The ends of the cross bar are connected to cam blocks 26 which are arranged to move vertically in guide ways 27. In the preferred form, there are two pairs of cam blocks, one pair being disposed above the crossbar, and the other pair below the bar, as is illustrated in Fig. 4. The guides for the blocks may comprise 2 bars, which are attached to the sidewall of the cradle. The preferred manner of connecting the cross bar to the cam blocks embodies pivot pins 28 which extend through ears 29 that depend from the upper blocks.

To assure equalization of pressure against the buffer blocks, I provide a flexible connection between the cross bar and the lower set of cam blocks. This may be accomplished by utilizing a tube 30 which houses a spring 31 and provides an abutment for the lower end thereof. A washer 32 provides an abutment for the upper end of the spring. A nut 33 bears against the washer and is threaded onto a rod 34 which extends through the lower block and is pivotally connected thereto at 35. A link 36 connects the tube to the pin 28. With this arrangement, all of the cam blocks are caused to move upwardly under the action of the counterweight 25 and to exert pressure uniformly against the buffer blocks. To this end the forward faces 40 of the cam blocks are shown as being inclined surfaces, which bear against similarly inclined rear faces 41 of the buffer blocks.

Provision is made for causing lateral motion of the buffers toward the car as the cam blocks are moved upwardly. To accomplish this the blocks are rigidly mounted between beams 42 which are preferably channel members arranged back to back, and which extend lengthwise of the blocks and engage the side walls 43 of the cam blocks. These beams therefore provide guides for lateral movement of the buffers while they are being shifted into engagement with the car. To prevent the buffer units from moving vertically simultaneously with the cam members, I have shown rollers 45 and 46 which are journalled in the buffer beams adjacent the lower end thereof, and which are adapted to be disposed respectively above and below the cross beam 47. The cross beam in turn is rigidly mounted on the cradle, and is shown in Fig. 1 as being disposed adjacent the upper part of the horizontal portion thereof.

Figure 2:
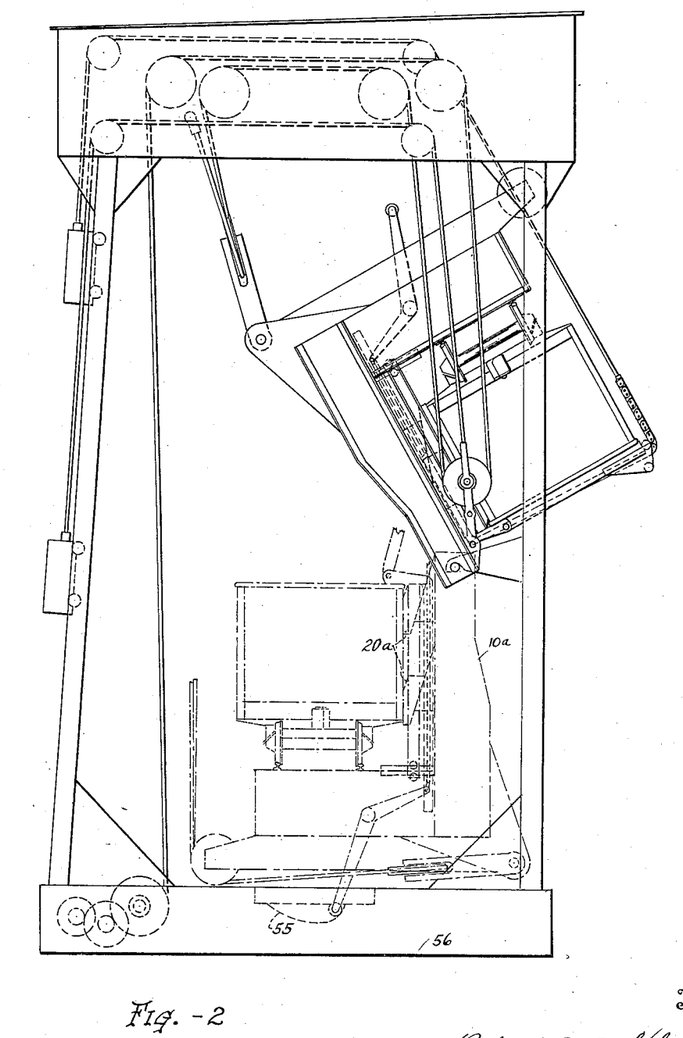
Fig. 2 is a similar elevation showing the cradle in dumping position.
Figures 3, 9, 10, 11:
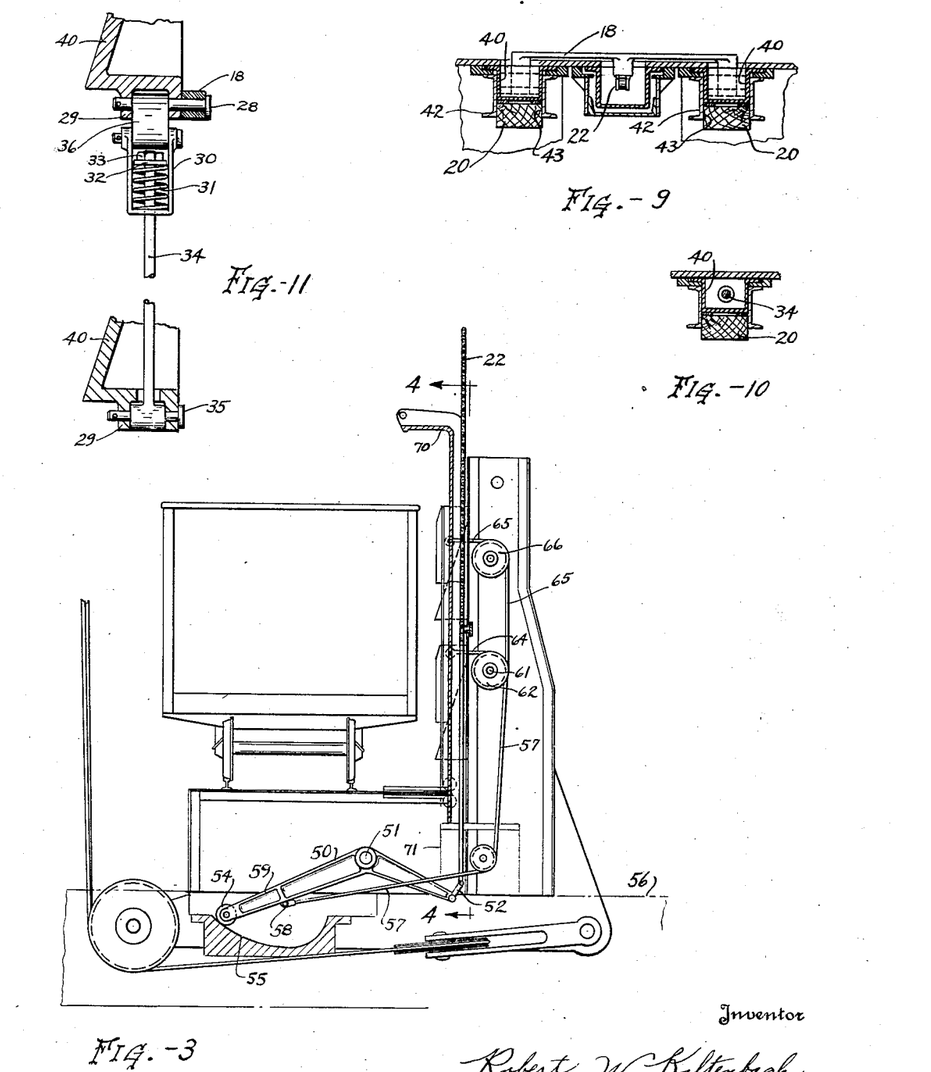
Fig. 3 is a vertical section showing on an enlarged scale the buffer block operating mechanism.
Figs. 9, 10, and 11 are sections taken on the correspondingly numbered lines in Fig. 4, Fig. 11 being on an enlarged scale.

When the cradle is in the normal position, as shown in Fig. 1, the cam blocks are held in the lowermost position and the buffers are held away from the car. One method of accomplishing this is to utilize bell cranks 50 each of which is pivotally mounted at 51 to the horizontal part of the cradle, and adjacent the bottom part thereof. One arm of the bell crank is adapted to be connected, as by a link 52, and rod 53, to the cross bar 18, directly beneath and in line with the clamp chain. The other end of the bell crank is shown as having a roller 54 which is adapted to engage a pillow block 55, which in turn, is rigidly mounted on the base 56 of the frame structure. The contour of the roller contacting face of the pillow block is such that the bell crank is permitted to move slowly with reference to the cradle during the initial period of the dumping operation. In Fig. 3, the cradle is at rest, and in such position the roller 54 is at the left hand end of the block. In Fig. 2, the cradle is shown in broken lines 10a as having been raised to the extent that the bell crank roller is in engagement with the right hand end of the pillow block.

Since the bell cranks are carried by the cradle, and since the weight of the cradle is greater than that of the counterweight, it is apparent that the bell cranks will be held in the position shown in Fig. 3 so long as the cradle is in the "rest" position. As the bell cranks move however, they permit the clamp counterweights to raise the cam blocks, which in turn force the buffers toward the car. The size of the operating parts and the clearance limits are such that the buffers are brought into contact with the side of the car before the bell cranks reach the limit of their movement.

Figure 8:
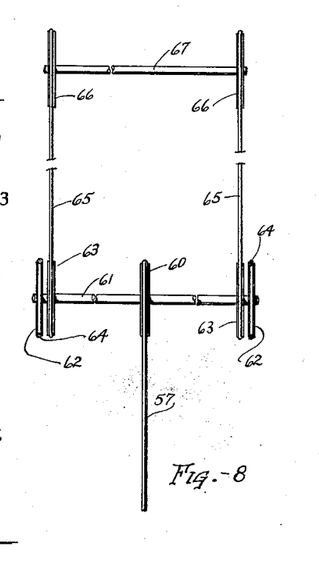
Fig. 8 is a diagrammatic view showing the arrangement of cables which are used in connection with the operation of the buffer blocks, illustrated in Fig. 4.

To permit lateral movement of the buffers toward the car, during the raising operation, and to insure withdrawal toward the cam block during the lowering operation, I have shown a cable 57, one end of which is pivotally connected at 58 to the arm 59 of the bell crank, and the other end of which extends around and is rigidly connected to a sheave 60. Such sheave is shown in Fig. 8 as being rigidly mounted on and adjacent the midportion of the shaft 61, which in turn is journalled in the cradle and in back of the lower set of buffer blocks. This shaft also has sheaves 62 and 63 rigidly mounted thereon and adjacent the ends thereof. Cables 64 have one end thereof rigidly connected to the sheaves 62, and after passing around the sheaves extend laterally and are attached at the opposite ends to the lower buffer blocks. Other cables 65 are rigidly connected to the sheaves 63 and after passing therearound, extend upwardly and over guide sheaves 66, and are then connected to the upper set of buffer blocks. The guide sheaves may be journalled on a shaft 67 which is also mounted on the cradle in back of the upper set of blocks as is illustrated in Figs. 3 and 8. With this arrangement, the buffer blocks are pulled toward the cam blocks while the bell crank roller moves along the curved surface of the pillow block during the lowering operation. Conversely, during the raising operation the cables permit the buffer blocks to be forced against the car.

It is apparent from the foregoing description, that the movement of the buffer blocks takes place independently of the movement of the associated clamps 70. There are usually four of such clamps, and each is arranged to be slidably mounted in the side wall of the cradle directly in front of the clamp chain. An abutment 71 (shown in Fig. 3) extends upwardly from the base 56 and provides a surface against which the clamp is supported out of contact with the car during the normal "rest" position. As the cradle is raised however, the clamp is caused to move vertically as soon as the car is brought into contact therewith. The clamp chains then function in the usual way to hold the clamps into contact with the top of the car during the inverting operation. In Fig. 2 the inverted position of the car and cradle is shown in the full lines.

Figures 5, 6:
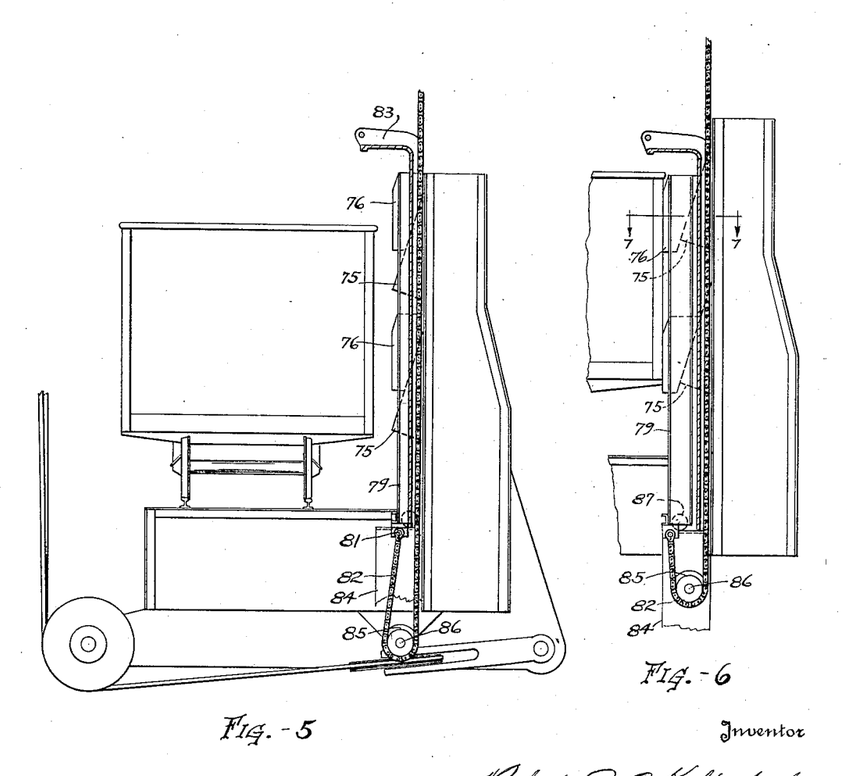
Fig. 5 is a vertical section through a cradle having a modification of my invention and Fig. 6 is a similar illustration showing the blocks in contact with the car.
Figure 7:
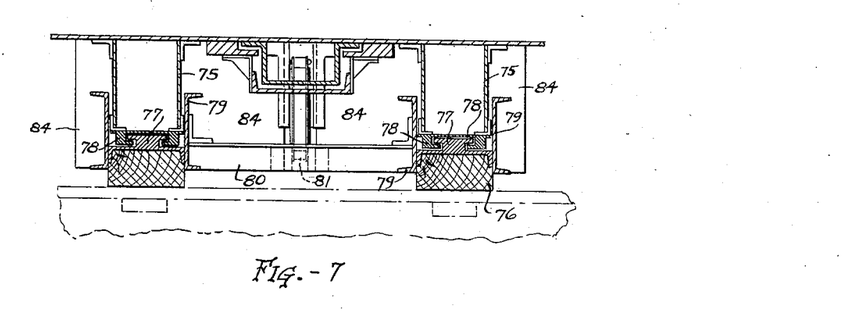
Fig. 7 is a horizontal section taken on a plane indicated by the line 7—7 in Fig. 6.

A modification of my invention is shown in Figs. 5, 6, and 7 for effecting lateral movement of the buffer toward and away from the car. In this modification the cam blocks 75 are rigidly connected to the side wall of the cradle while the buffer blocks 76 move vertically and laterally with reference thereto. As shown in Fig. 7 each buffer block has a tongue 77 which fits into suitable guideways 78 on the associated cam block. A further guiding means embodies beams 79 which extend lengthwise and outside of the buffer blocks. A cross beam 80 connects each set of beams 79, and provides a support for the pivot connection 81 with the lower end of the clamp chain 82. In the "rest" position the buffer block beams and the clamp 83 rest upon an abutment 84 which extends upwardly from the base and straddles the clamp chain. In such rest position, as shown in Fig. 5, the buffer blocks and the clamps are out of contact with the car.

To effect movement of the blocks toward the car during the raising operation, I have shown each clamp chain as extending downwardly beneath the associated block and as passing around a sheave 85, the shaft 86 of which is journalled in part of the cradle. Thus, as the cradle moves upwardly with the cam blocks 75, the buffer blocks are held against upward movement by the action of the counterweights acting upon the chains 82 until the blocks engage the car. Thereupon, the buffer block cross beam 80 leaves the abutment and the buffer blocks move upwardly as a unit with the cradle. During the lateral movement of the buffer blocks toward and away from the car, the buffer block beams are moved across the abutments on the rollers 87.

Figures 12, 13:
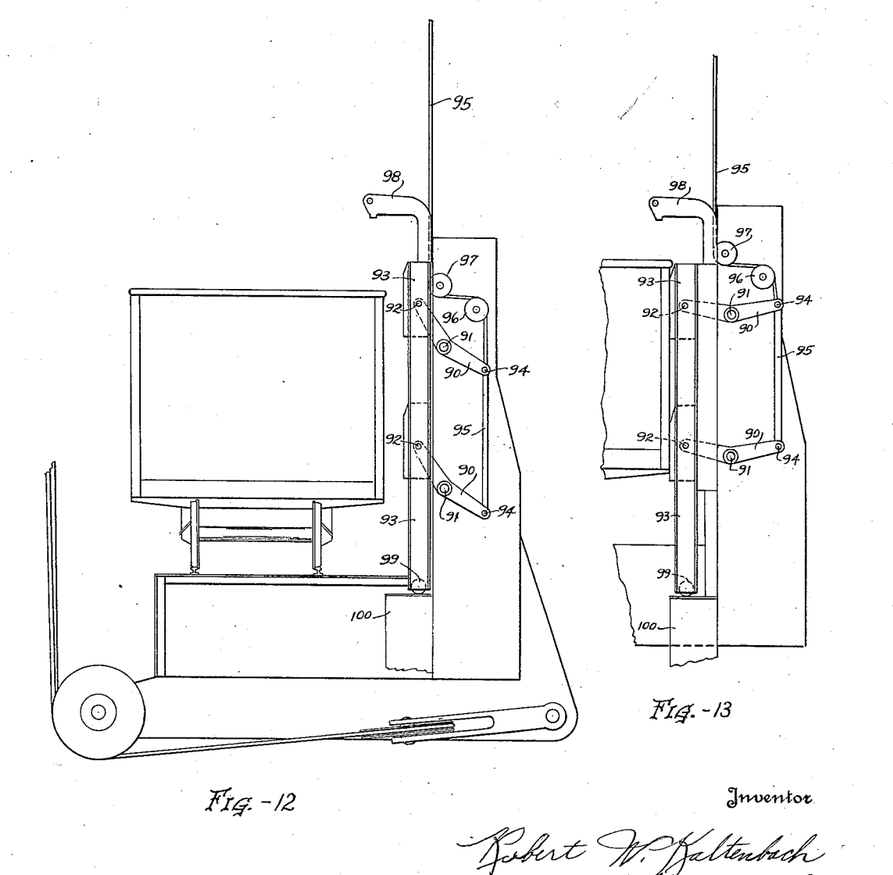
Fig. 12 is an end view of a cradle, having another modification of my invention.
Fig. 13 is a view showing the position of the mechanism illustrated in Fig. 12 when the blocks are in contact with the car.

Another modification of my invention is shown in Fig. 12 wherein bell cranks 90 are pivotally mounted at 91 to the cradle, and are connected at 92 on one end to the buffer block beams 93, and at the other end at 94 to the clamp chain 95, which passes upwardly over the sheaves 96 and 97 and then in back of the clamp 98 in the usual way. The buffer beams are shown as having a roller 99 at the bottom thereof which rests upon an abutment 100 when the cradle is in the "rest" position.

In Fig. 12, the "rest" position illustrates the buffers as being out of contact with the car while Fig. 13 illustrates the block as being in engagement with the car at the time when the rollers 99 are about to leave the abutment 100.

Figure 14:
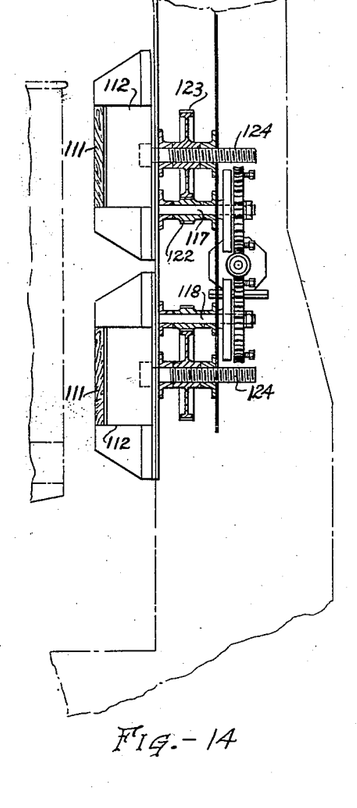
Fig. 14 is a vertical section through the cradle having another modification of means for operating the buffer blocks.
Figure 15:
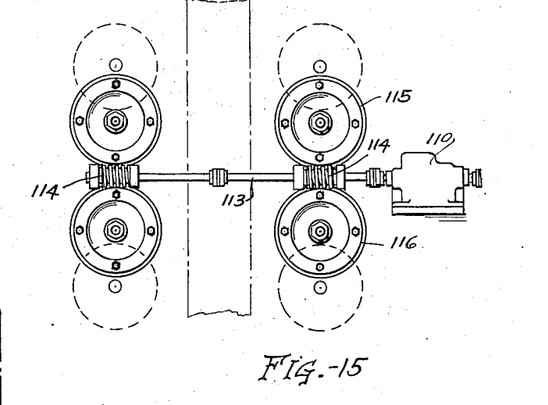
Fig. 15 is a front view of the mechanism shown in Fig. 14.
Figure 16:
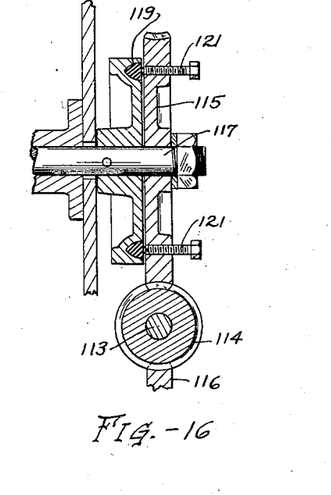
Fig. 16 is a sectional view on an enlarged scale through part of the driving mechanism for the modification shown in Fig. 14.

Figs. 14 and 15 indicate another modification of my invention, wherein a reversible electric motor 110 is mounted on the cradle and is utilized for moving the buffer blocks 111 in guideways 112 toward and away from the car. To this end, the armature shaft of the motor is directly connected to a worm shaft 113 which carries a worm 114, adjacent each set of buffer blocks. Worm wheels 115 and 116 are arranged to be driven by each worm, and are rotatably mounted on shafts 117 and 118 respectively. Such shafts are then connected to the wheels preferably by a friction coupling. One form of such coupling, as shown in Fig. 16, comprises an annular ring 119 which engages a complementary shaped groove in a wheel 120. This last named wheel in turn is fixed to the shaft. The friction ring may be adjusted laterally by set screws 121, and thus the motor is connected to the shafts 117 and 118 by a friction drive. Hence, the buffer blocks move into contact with the car and exert uniform pressure thereagainst, notwithstanding irregularities in the surface of the side of the car. Moreover, the friction connection prevents overloading of the motor when the buffers engage the car.

In view of the foregoing description, it is apparent that I have provided a novel means of automatically effecting side contact with the car without necessitating the use of a platen upon which the car rests, and which is intended to be moved laterally on the cradle. I have shown different ways in which this result can be accomplished and have hereinafter pointed out the essential characteristics in the appended claims.

To connect the shafts 117 and 118 to the buffer blocks, I have shown each shaft as carrying a pinion 122 which meshes with a gear 123 on a threaded shaft 124. Such last named shaft is fixed to the buffer block. It is obvious that this arrangement will cause lateral motion of the blocks toward the car and will serve to lock the block in such position.

Figure 17:
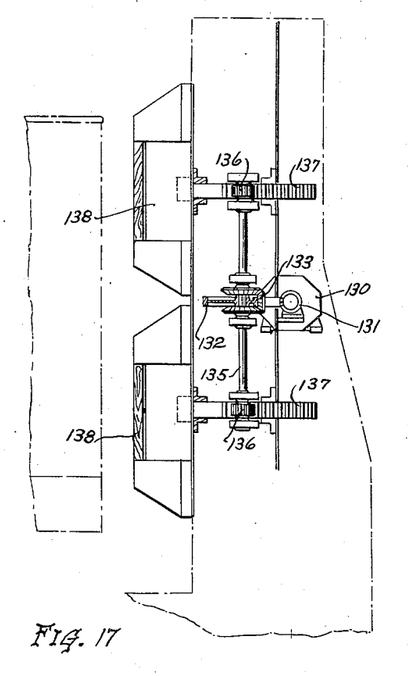
Fig. 17 is a vertical section through a cradle showing another modified form of buffer operating mechanism.

Fig. 17 shows another modification of my invention wherein an electric motor 130, mounted on the cradle, drives a worm 131, which in turn operates a worm wheel 132. Such worm wheel comprises the ring gear of a differential, indicated in general at 133. The differential actuates a shaft 134 which extends upwardly to operate the upper buffer block, and another shaft 135 which extends downwardly to operate the lower buffer block. Each of the last named shafts carries a pinion 136 which is arranged to mesh with a rack 137. These racks are then fastened to the buffer blocks 138, which are arranged to move laterally in guideways in the same manner as that illustrated and explained in connection with Fig. 14.

Figure 18:
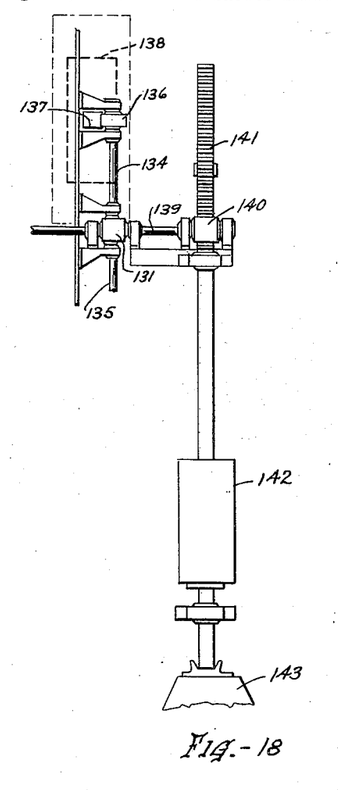
Figs. 18 and 19 are views of different forms of motive power for operating the buffer blocks shown in Fig. 17.

Fig. 18 shows a different form of motive power for operating the mechanism illustrated in Fig. 17. In such illustration, like parts carry the same reference characters, while the shaft, on which the worm 131 is carried, is indicated at 139. Such shaft carries a pinion 140 which meshes with a vertically extending rack 141. The lower end of the rack is weighted as at 142, and is intended normally to be in engagement with an abutment 143 when the cradle is in the normal "rest" position. When the cradle is raised, the action of gravity holds the rack stationary, thus causing the pinion 114 to rotate and to actuate the gear mechanism to move the blocks toward the car. During the operation, the differential acts to insure the application of uniform pressure against the car. When engagement is effected, the weighted rack is lifted with the cradle.

Figure 19:
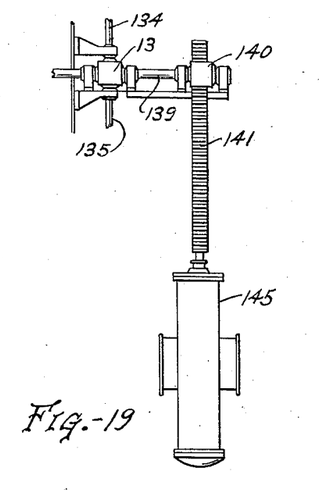

Fig. 19 shows a similar arrangement, wherein the rack 141 is arranged to be actuated by fluid pressure within a cylinder 145. In such case, the cylinder is mounted on a cradle and the fluid pressure, acting upon a piston at the end of the rack, may be readily controlled to effect the desired buffer block operation in each direction.

I claim:

1. In a car dumper, the combination with a support having tracks thereon, said tracks being adapted to support a car, means carried by the support and shiftable laterally with reference thereto for engaging the side of the car, a counterweight, a cable connected to the counterweight and a movable member operated by the cable and engaging said means for holding it in engagement with the side of the car during the dumping operation.

2. In a car dumper, the combination with a cradle adapted to support a car, a clamp carried by the cradle and adapted to engage the top of the car, a counterweight, a cable connected to the counterweight and adapted to engage the clamp for holding it against the car during the dumping operation, a buffer block movably mounted on the cradle and means connected to the cable for moving the buffer block into engagement with the side of the car, and supporting it during the dumping operation.

3. In a car dumper, the combination with a car support, of a clamp carried thereby, and adapted to engage the top of the car on the support, a counterweight operatively connected with the clamp to hold it in engagement with the car during the dumping operation, and a buffer carried by the support and normally disposed out of engagement with the car when the support is in the rest position, and means controlled by the counterweight for moving the buffer into engagement with the side of the car during the initial movement of the dumping operation.

4. In a car dumper, the combination with a cradle adapted to support a car, of a buffer carried by the cradle, and normally held out of contact with a car thereon, and a counterweight, a cable attached to the counterweight, means operatively connected to the cable and buffer for moving the buffer into engagement with one side of the car during the initial movement of the dumping operation, and a stationary support coacting with said means to return the buffer automatically to the normal position during the final movement of the dumping operation.

5. In a car dumper, the combination with a car supporting cradle, of a clamp slidably mounted upon the cradle, a counterweight, a cable connected to the counterweight, a buffer block, means operated by the cable and engaging the buffer block for moving the block into engagement with the side of a car on the cradle and for supporting it during the dumping operation and a stationary abutment adapted to engage said means for moving the block out of contact with the car near the end of the dumping operation.

6. In a car dumper, the combination with a movable car supporting cradle, of a buffer carried thereby, a cam adapted to engage the buffer for moving it into engagement with the car during the dumping operation, a counterweight, and a cable connected to the counterweight, and to the cam for moving the cam into engagement with the buffer, and thereby to force the buffer into engagement with a car on the cradle.

7. In a car dumper, the combination with a car supporting cradle, of a buffer carried by the cradle and adapted to engage the side of a car on the cradle, a counterweight, a cable connected to the counterweight and adapted to move the buffer into engagement with the side of the car during the dumping operation, a stationary abutment, a member pivoted on the cradle and adapted to engage the abutment, and means for connecting the member to the buffer for withdrawing it from engagement with the car near the end of the dumping operation, said abutment member and means being adapted to oppose the counterweight, and thereby to govern the speed of the buffer toward the side of the car during the dumping operation.

8. In a car dumper, the combination with a car supporting cradle, of a buffer carried thereby and adapted to be moved with reference thereto and into engagement with the side of a car on the cradle, a counterweight, a cable connected thereto, means connected to the cable for moving the buffer into engagement with the car, a lever pivotally mounted on the cradle and connected to the cable, and abutment means adapted to be engaged by said lever, said means acting upon the lever during the final movement of the dumping operation to move the buffer out of engagement with the car.

9. In a car dumper, in combination with a cradle adapted to support a car, of a buffer carried by the cradle and movable with reference thereto, a bell crank pivotally mounted on the cradle, a counterweight, a flexible member connecting the counterweight to the lever, means connected to said member for moving the buffer toward the car, an abutment adapted to be engaged by the bell crank for limiting the speed of the counterweight toward the car, said abutment coacting with the belt crank to withdraw the buffer away from the car during the final period of the dumping operation.

10. In a car dumper, in combination with a cradle, of a buffer slidably mounted thereon and adapted to be moved into engagement with the side of a car on the cradle, a counterweight, a cable connected thereto, means connected to the cable for moving the buffer toward the car, a lever pivotally mounted on the cradle, and an abutment adapted to be engaged by the lever during the downward movement of the cradle for effecting movement of the lever with relation to the cradle, and means connecting the lever to the buffer, whereby such relative motion of the lever moves the buffer out of contact with the car.

11. In a car dumper, the combination with a cradle adapted to support a car thereon, a pair of buffer blocks carried by the cradle and adapted to be moved laterally into engagement with the car, a counterweight, a flexible member extending from the counterweight, and means coacting with said member to move the blocks toward the car, said means including mechanism for equalizing the presure of the buffers against the car.

12. In a car dumper, in combination with a cradle adapted to support a car thereon, a clamp, a plurality of buffer blocks arranged in pairs on each side of the clamp, a counterweight, a flexible member leading from the counterweight, a cam block associated with each buffer block, a bar connected to the free end of said flexible member, and means operatively connecting the bar to each cam block, said means operating to equalize the pressure of the buffer blocks against the car.

13. In a car dumper, the combination with a cradle adapted to support a car thereon, a buffer carried by the cradle and movable laterally in reference thereto, a counterweight, a flexible member leading therefrom, a sheave on the cradle, said member extending downwardly around the sheave and having the free end thereof connected to the buffer, whereby the counterweight tends to draw the buffer downwardly, and means mounted on the cradle for engaging the buffer and moving it laterally against the action of the counterweight.

14. In a car dumper, the combination with a cradle adapted to support a car thereon, a buffer mounted on the cradle and adapted to move laterally into engagement with the car, cam means on the cradle for engaging the buffer, a counterweight, a flexible member leading therefrom and being operatively connected to the buffer, whereby the counterweight draws the buffer downwardly, as the cradle is raised, until the buffer engages the side of the car, and thereafter holds it against the car, whereby the buffer, cradle and car move as a unit during the dumping operation.

15. In a car dumper, the combination with a car supporting cradle adapted to support a car thereon, a pair of buffer blocks carried by the cradle and adapted to be moved laterally into engagement with a car on the cradle, a pair of members movably mounted on the cradle and adapted to engage the blocks, a single actuator, means for connecting the actuator to said members, and for equalizing the pressure of the members against the blocks.

16. In a car dumper, the combination with a car supporting cradle adapted to support a car thereon, of a pair of buffer guideways mounted on the cradle, a buffer slidable laterally within each guideway, a counterweight, a cable connected to the counterweight, cam blocks slidable longitudinally of and within the guideways and adapted to engage the buffers, means for connecting the cable to each of the cam blocks, whereby the counterweight tends to move the blocks and thereby to force the buffers laterally into engagement with the car, a stationary abutment, a bell crank lever, means connecting one end of the lever to the cable and means connecting the other end of the lever to the buffers, said lever being adapted to engage the abutment and thereby to control the speed of movement of the buffers toward the car during the dumping operation, and to withdraw the buffers from the car at the end of the dumping operation.

17. In a car dumper, the combination with a supporting cradle of a cam block rigidly mounted thereon, a buffer block slidably mounted on the cam block and movable laterally thereof, a counterweight, a cable connected to the counterweight, means for connecting the cable to the buffer block, a stationary abutment, and means adapted to act against the counterweight to withdraw the buffer block from engagement with the side of a car at the end of the dumping operation.

18. In a car dumper, the combination with a car supporting cradle of a counterweight, a cable connected thereto, a lever pivotally mounted upon the cradle, a buffer pivotally connected to one end of the lever, means connecting the other end of the lever to the cable, whereby the counterweight tends to force the buffer laterally into engagement with a car on the cradle, a stationary abutment, and means connected to the buffer for engaging the abutment near the end of the dumping operation, whereby the abutment acts against the counterweight to move the buffer out of engagement with the car.

In testimony whereof, I hereunto affix my signature.

ROBERT W. KALTENBACH.